United States Patent
Inohiza

(10) Patent No.: US 12,224,862 B2
(45) Date of Patent: Feb. 11, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 17/880,494

(22) Filed: Aug. 3, 2022

(65) Prior Publication Data

US 2023/0023120 A1 Jan. 26, 2023

Related U.S. Application Data

(63) Continuation of application No. PCT/JP2021/001841, filed on Jan. 20, 2021.

(30) Foreign Application Priority Data

Feb. 7, 2020 (JP) ................. 2020-020168

(51) Int. Cl.
*H04L 1/08* (2006.01)
*H04L 1/1812* (2023.01)
(Continued)

(52) U.S. Cl.
CPC .............. *H04L 1/08* (2013.01); *H04L 1/1812* (2013.01); *H04W 74/0816* (2013.01); *H04W 84/12* (2013.01)

(58) Field of Classification Search
CPC ...... H04L 1/08; H04W 74/0816; H04W 84/12
See application file for complete search history.

(56) References Cited

U.S. PATENT DOCUMENTS

2007/0076675 A1 4/2007 Chen
2014/0293868 A1 10/2014 Levanen
(Continued)

FOREIGN PATENT DOCUMENTS

CN 103222317 A 7/2013
EP 3447946 A1 2/2019
(Continued)

OTHER PUBLICATIONS

Han, Jing et al.; Design and simulation of an underwater acoustic network; IEEE Xplore; 2007 IET Conference on Wireless, Mobile and Sensor Networks (CCWMSN07); Shanghai, 2007; pp. 604-607.
(Continued)

*Primary Examiner* — Won Tae C Kim
(74) *Attorney, Agent, or Firm* — Canon U.S.A., Inc. IP Division

(57) ABSTRACT

Data including a plurality of blocks is received from a communication apparatus 102. A communication time of retransmission data which is a part of the received data and which is to be retransmitted by the communication apparatus 102 and a communication time of a response signal to be transmitted by the communication apparatus 103 are acquired. The response signal in which a communication reservation time is set is transmitted wherein the communication reservation time includes the communication time of the retransmission data and the communication time of the response signal.

13 Claims, 7 Drawing Sheets

(51) Int. Cl.
*H04W 74/0816* (2024.01)
*H04W 84/12* (2009.01)

(56) References Cited

U.S. PATENT DOCUMENTS

2016/0380727 A1   12/2016  Ryu
2017/0026162 A1*  1/2017   Nabetani ............... H04L 1/1854

FOREIGN PATENT DOCUMENTS

JP    2003-124915 A    4/2003
JP    2014-524709 A    9/2014

OTHER PUBLICATIONS

Sun, Yan-jing et al.; Survey of Self-Interference Cancellation and MAC Scheduling for In-Band Full-Duplex Wireless Communication; Journal of University of Electronic Science and Technology of China; vol. 45; No. 6; Nov. 2016; pp. 873-887.

* cited by examiner

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2021/001841, filed Jan. 20, 2021, which claims the benefit of Japanese Patent Application No. 2020-020168, filed Feb. 7, 2020, both of which are hereby incorporated by reference herein in their entirety.

TECHNICAL FIELD

The present invention relates to data retransmission in wireless communication.

BACKGROUND ART

IEEE 802.11 series is known as a WLAN communication standard established by IEEE (Institute of Electrical and Electronics Engineers). Note that WLAN is an abbreviation for Wireless Local Area Network. The IEEE802.11 series standards include IEEE802.11a/b/g/n/ac/ax standards. In the IEEE802.11ax standard, high peak throughput is realized by executing wireless communication using OFDMA (Orthogonal Frequency Division Multiple Access).

In the IEEE, to achieve a further improvement in throughput and frequency utilization efficiency, development of IEEE802.11be standard is ongoing, which will be a new standard in IEEE802.11 series. In the IEEE802.11be standard, it is considered to use HARQ (Hybrid Automatic Repeat request) as a method of data error correction.

In HARQ, as disclosed in PTL 1, a data frame is divided into units called HARQ blocks, and an error correction code is added in each HARQ block. When an error correction of a HARQ block is failed, information relating to this error HARQ block is transmitted using a HARQ ACK frame from a reception apparatus to a transmission apparatus. Based on the information described in the ACK frame, the transmission apparatus retransmits the HARQ block which has encountered the error, and the reception apparatus can perform error correction using the retransmitted HARQ block and the data frame which has encountered the error. As disclosed in PTL 1 (described below), in the error correction of a data frame using HARQ, a communication apparatus performs the error correction by using a retransmitted HARQ block and a previously transmitted data frame which has encountered the error. That is, to perform the error correction, the communication apparatus needs to hold the data frame which has encountered the error until the error correction is performed. However, there is an upper limit to the capacity of the memory that holds the received data. Therefore, when the communication apparatus receives another data frame before the HARQ block is retransmitted, the data frame that has encountered the error is discarded. In this case, the data frame is retransmitted again, which causes a reduction in the frequency utilization efficiency.

CITATION LIST

Patent Literature

PTL 1: Japanese Patent Laid-Open No. 2003-124915

SUMMARY OF INVENTION

In view of the above, it is an object of the present invention to improve the frequency utilization efficiency when a part of the received data is retransmitted.

To achieve the above object, the present invention provides a communication apparatus including reception means configured to receive data from another communication apparatus, acquisition means configured to acquire a communication time of retransmission data which is a part of the data received by the reception means and which is to be retransmitted by the other communication apparatus and a communication time of a first response signal to be transmitted in response to the data received by the reception means, and transmission means for transmitting the first response signal in which a communication reservation time is set, the communication reservation time including the communication time of the retransmission data and the communication time of the first response signal which are acquired by the acquisition means.

Further features of the present invention will become apparent from the following description of exemplary embodiments with reference to the attached drawings.

DESCRIPTION OF EMBODIMENTS

Embodiments of the present invention are described in detail below with reference to accompanying drawings. Note that configurations shown in the following embodiments are merely examples, and the present invention is not limited to these configurations illustrated below.

Figure 1:
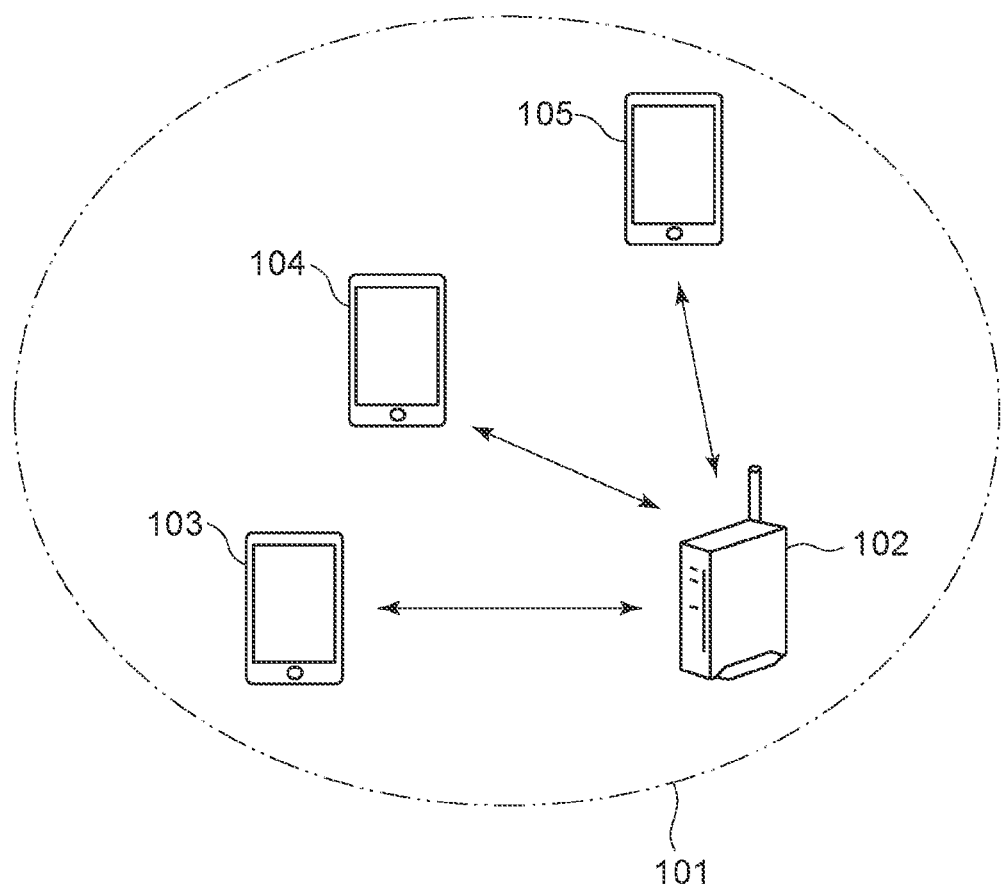
FIG. 1 is a diagram showing a configuration of a network to which a communication apparatus 103 belongs.

FIG. 1 shows a configuration of a network in which a communication apparatus 103 according to the present embodiment participates. The communication apparatus 103 is a station (Station, STA) having a role of participating in a network 101. The network 101 is a wireless network which is established by a communication apparatus 102. The communication apparatus 102 is an access point (Access Point, AP) having a role of establishing a network. In addition to the communication apparatus 103, communication apparatuses 104 and 105, which are STAs, may participate in the network 101.

Each communication apparatus supports the IEEE802.11be (EHT) standard, and can perform wireless communication according to the IEEE802.11be standard via the network 101. Note that IEEE is an abbreviation for Institute of Electrical and Electronics Engineers, and EHT is an abbreviation for Extremely High Throughput. EHT may be interpreted as an abbreviation for Extreme High Throughput. Each communication apparatus is capable of communicating in frequency bands of 2.4 GHz band, 5 GHz band, and 6 GHz band. The frequency bands used by each communication apparatus are not limited to those, and different frequency bands such as a 60 GHz band may be used. Each communication apparatus may use a bandwidth of 20 MHz, 40 MHz, 80 MHz, 160 MHz, or 320 MHz in communication.

Each communication apparatus performs OFDMA communication according to the IEEE802.11be standard. OFDMA is an abbreviation for Orthogonal Frequency Division Multiple Access. In the OFDMA communication, a part of the divided frequency bands (RU, Resource Unit) are assigned to respective STAs such that there is no overlap and carrier waves assigned to the respective STA are orthogonal.

Each communication apparatus can use HARQ (Hybrid Automatic Repeat reQuest) as a data error correction method. In HARQ, a data frame is divided into units called HARQ blocks, and an error correction code is added in each HARQ block. The HARQ blocks are blocks obtained by dividing data in units of predetermined lengths. When an error correction of a HARQ block is failed, information related to this error HARQ block is transmitted using a HARQ response signal frame from a reception apparatus to a transmission apparatus. The response signal transmitted here is an ACK (ACKnowledgement, acknowledgment response) frame. According to ACK frame information, the transmission apparatus retransmits the HARQ block which has encountered the error. The reception apparatus can correct the error by combining the retransmitted HARQ block (retransmitted data) with the data frame which has encountered the error. As described above, when HARQ is used, the error correction can be achieved by retransmitting only a part of the data frame (only a HARQ block) without retransmitting all of the data frame.

In a case where HARQ is not used as an error correction method, the communication apparatus protects the data frame with an error correction code, and transmits the redundant error correction code together with the data frame thereby enabling error correction on the reception apparatus side. Because an error detection code is further added to the data frame, the reception apparatus can perform error detection for the received data using the error detection code. In a case where the reception apparatus has correctly decoded the received data (in a case where no error is detected in the received data), the reception apparatus transmits an ACK frame, as a response, to the transmission apparatus. However, in a case where the reception apparatus fails to correctly decode the received data (in a case where an error is detected in the received data), the reception apparatus does not transmit the ACK frame. In this case, alternatively, the reception apparatus may transmit a response indicating the occurrence of the error to the transmission apparatus. In a case where the transmission apparatus does not receive an ACK frame in a predetermined time after transmitting the data frame or in a case where a response indicating an occurrence of an error is received, the transmission apparatus retransmits the previously transmitted data frame.

Using HARQ makes it possible for each communication apparatus to perform retransmission in units of HARQ blocks smaller than a data frame, and thus it becomes possible to efficiently transmit/receive retransmission data. In addition, using HARQ, it is possible to achieve an increase in error tolerance.

In the case where HARQ is used as an error correction method, a CSMA/CA method may be used to avoid interference when a HARQ block is retransmitted. Note that CSMA/CA is an abbreviation for Carrier Sense Multiple Access/Collision Avoidance. However, when the CSMA/CA method is used, the transmission apparatus needs to perform carrier sense processing and backoff processing each time a HARQ block is retransmitted, which causes a reduction in the utilization efficiency of the frequency channel. To handle the above situation, a communication time for retransmitting a HARQ block may be reserved in advance, thereby making it possible to omit the carrier sense processing at the time of retransmitting a HARQ block, and thus making it possible to improve the utilization efficiency of frequency channels.

In the present embodiment, when the data frame reception apparatus requests the transmission apparatus to retransmit a HARQ block, the data frame reception apparatus calculates the communication time required for retransmission and reserves the calculated communication time thereby making it possible to perform the retransmission of the HARQ block without performing carrier sense processing. This makes it possible to improve the frequency utilization efficiency when HARQ is used as an error correction method.

It is assumed that the communication apparatuses 102 and 103 support the IEEE802.11be standard. In addition, the communication apparatuses 102 and 103 also support at least one of the legacy standards prior to the IEEE802.11be standard. The legacy standards include the IEEE802.11a/b/g/n/ac/ax standards. In the present embodiment, at least one of the IEEE802.11a/b/g/n/ac/ax/be standards is referred to as an IEEE802.11 series standard. In addition to the IEEE802.11 series standards, other communication standards such as Bluetooth (registered trademark), NFC, UWB, Zigbee, MBOA, and/or the like may be supported. UWB is an abbreviation for Ultra Wide Band, and MBOA is an abbreviation for Multi Band OFDM Alliance. OFDM is an abbreviation for Orthogonal Frequency Division Multiplexing. NFC is an abbreviation for Near Field Communication. UWB includes wireless USB, wireless 1394, Winet, etc. A communication standard for wired communication such as a wired LAN may be supported.

Specific examples of the communication apparatus 102 include, but are not limited to, a wireless LAN router and a PC. Any communication apparatus may be used as the communication apparatus 102 as long as it can execute communication using HARQ with another communication apparatus. The communication apparatus 102 may be an information processing apparatus such as a wireless chip capable of executing wireless communication according to the IEEE802.11be standard. Specific examples of the communication apparatus 103 include, but are not limited to, a camera, a tablet device, a smartphone, a PC, a mobile phone, a video camera, etc. Any communication apparatus may be used as the communication apparatus 103 as long as it can execute communication using HARQ with another communication apparatus. The communication apparatus 103 may be an information processing apparatus such as a wireless chip capable of executing wireless communication according to the IEEE802.11be standard. Note that the numbers of APs and the number of STAs located in the network are not limited to those shown in FIG. 1. Note that an information processing apparatus such as a wireless chip has an antenna for transmitting a generated signal.

In the present embodiment, it is assumed by way of example that data is transmitted from the communication apparatus 102 functioning as an AP to the communication apparatus 103 functioning as an STA, but data may be transmitted from the communication apparatus 104 serving as an STA instead of from the communication apparatus 102 serving as an AP to the communication apparatus 103. HARQ may be used also in data transmission from the communication apparatus 104 (STA) to the communication apparatus 103 (STA), and the communication apparatus 104 may execute a flow described later with reference to FIG. 7.

In the present embodiment, an explanation is given, by way of example, for a case where data is transmitted from the communication apparatus 102 (AP) to the communication apparatus 103 (STA), but data may be transmitted from the STA to the AP. In this case, the communication apparatus 103 may execute the process described later with reference to FIG. 7, and the communication apparatus 102 may execute the process described later with reference to FIG. 8.

Figure 2:
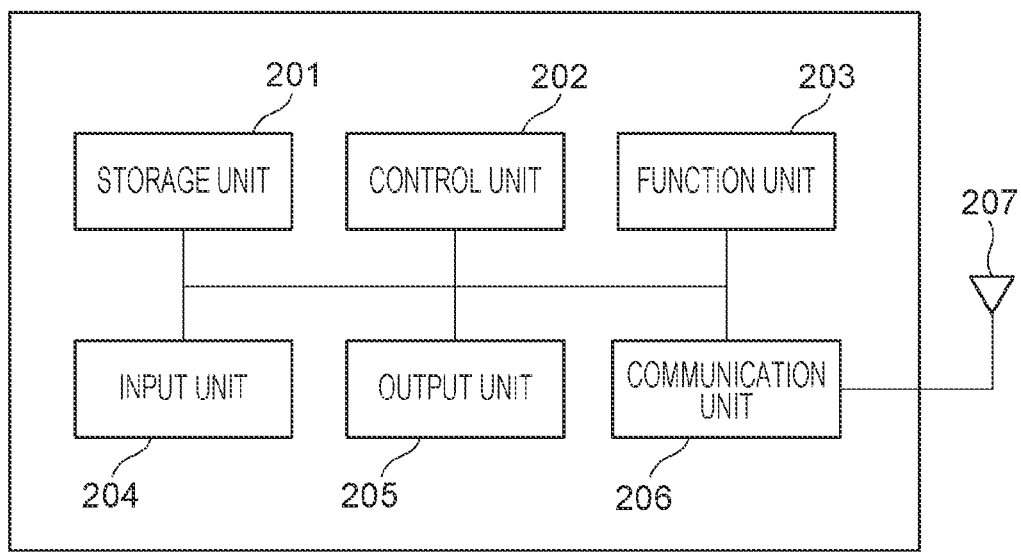
FIG. 2 is a diagram showing a hardware configuration of the communication apparatus 103.

FIG. 2 illustrates a hardware configuration of the communication apparatus 103 according to the present embodiment. The communication apparatus 103 includes a storage unit 201, a control unit 202, a function unit 203, an input unit 204, an output unit 205, a communication unit 206, and an antenna 207.

The storage unit 201 includes one or more memories such as a ROM, a RAM and/or the like, and stores a computer program for performing various operations described later and various kinds of information such as a communication parameter for wireless communication. ROM is an abbreviation for Read Only Memory, and RAM is an abbreviation for Random Access Memory. Examples of the storage unit 201 include, in addition to memories such as a ROM, a RAM or the like, a storage medium such as a flexible disk, a hard disk, an optical disk, a magneto-optical disk, a CD-ROM, a CD-R, a magnetic tape, a non-volatile memory card, and a DVD. The storage unit 201 may include a plurality of memories or the like.

The control unit 202 includes one or more processors such as a CPU, an MPU and/or the like, and controls the entire communication apparatus 103 by executing a computer program stored in the storage unit 201. Here, CPU is an abbreviation for Central Processing Unit, and MPU is an abbreviation for Micro Processing Unit. The control unit 202 may control the AP in cooperation with the computer program stored in the storage unit 201 and the OS (Operating System). The control unit 202 may be composed of a plurality of processors such as a multi-core processor thereby controlling the entire communication apparatus 103. The control unit 202 generates data or a signal (a wireless frame) to be transmitted in communication with another communication apparatus. Here, CPU is an abbreviation for Central Processing Unit, and MPU is an abbreviation for Micro Processing Unit. The control unit 202 may include a plurality of processors such as a multi-core processor, and the plurality of processors may control the entire communication apparatus 103.

The control unit 202 controls the function unit 203 to execute predetermined processing such as wireless communication, imaging, printing, projecting, or the like. The function unit 203 is hardware used by the communication apparatus 103 to execute a predetermined process.

The input unit 204 accepts various operations by a user. The output unit 205 provides various outputs to the user via a monitor screen and/or a speaker. The outputs by the output unit 205 may be provided by displaying information on a monitor screen, audio information via a speaker, or providing a vibration, or the like. Note that the input unit 204 and the output unit 205 may be integrated in one module as in a touch panel. The input unit 204 and the output unit 205 may be respectively integrated with the communication apparatus 103 or may be separate from the communication apparatus 103.

The communication unit 206 controls wireless communication in accordance with the IEEE802.11be standard. The communication unit 206 may control wireless communication according to other IEEE802.11 series standards in addition to the IEEE802.11be standard, or may control wired communication such as a wired LAN. The communication unit 206 controls the antenna 207 to transmit and receive signals for wireless communication generated by the control unit 202. In a case where the communication apparatus 103 supports the NFC standard, the Bluetooth standard, and/or the like in addition to the IEEE802.11be standard, wireless communication may be controlled in accordance with these communication standards. In a case where the communication apparatus 103 is capable of executing wireless communication according to a plurality of communication standards, communication units and antennas may be provided separately for the respective communication standards. The communication apparatus 103 communicates data such as image data, document data, and video data with the communication apparatus 102 via the communication unit 206. The antenna 207 may be provided separately from the communication unit 206, or may be integrated with the communication unit 206 into a single module.

The communication apparatuses 102, 104, and 105 may have the same hardware configuration as the communication apparatus 103.

Figure 3:
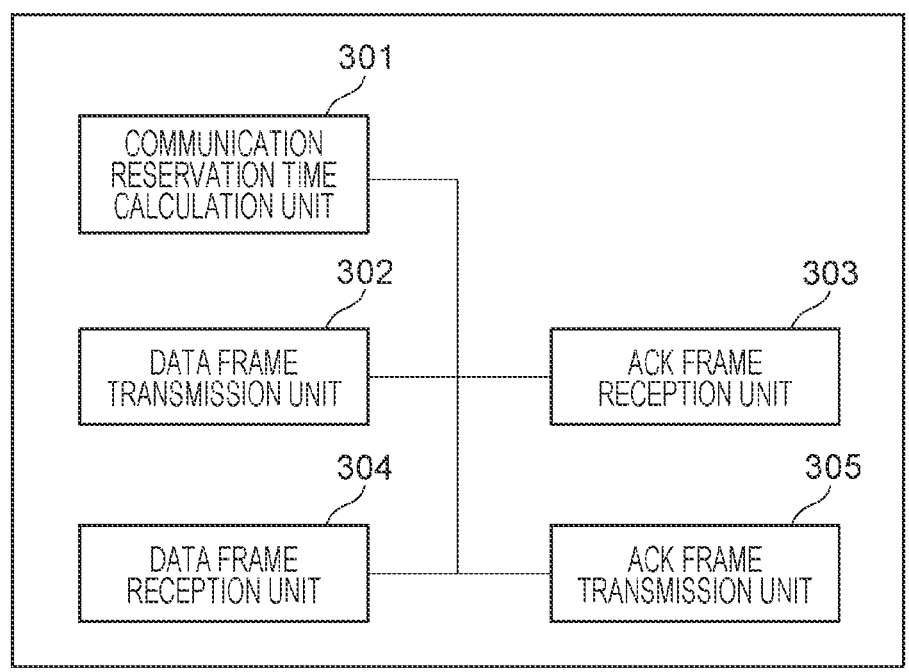
FIG. 3 is a diagram showing a functional configuration of the communication apparatus 103.

FIG. 3 shows a functional configuration of the communication apparatus 103 according to the present embodiment. The communication apparatus 103 includes a communication reservation time calculation unit 301, a data frame transmission unit 302, an ACK frame reception unit 303, a data frame reception unit 304, and an ACK frame transmission unit 305.

The communication reservation time calculation unit 301 is a block that calculates the communication time required for the communication apparatus 103 to perform communication. More specifically, the communication reservation time calculation unit 301 calculates the time for which the communication apparatus 103 occupies a frequency channel to transmit a data frame or an ACK frame. The details of the method of calculating the communication time executed by the communication apparatus 103 will be described later.

The data frame transmission unit 302 is a block for transmitting a data frame. In a case where HARQ is used as an error correction method, a data frame containing one or more HARQ blocks is transmitted.

The ACK frame reception unit 303 is a block for receiving an ACK frame from the reception apparatus after transmitting the data frame. When HARQ is used as the error correction method, the received ACK frame includes information indicating the reception state of the transmitted HARQ blocks. Based on the information included in the received ACK frame indicates, the communication apparatus 103 can retransmit, using the data frame transmission unit 302, a HARQ block, among HARQ blocks, for which an error is detected at the reception apparatus.

The data frame reception unit 304 is a block for receiving a data frame transmitted from the transmission apparatus. In a case where HARQ is used as the error correction method, a data frame including one or more HARQ blocks is transmitted.

The ACK frame transmission unit 305 is a block for transmitting an ACK frame in response to a received data frame. When HARQ is used as the error correction method, an ACK frame including information indicating the reception state of one or more HARQ blocks included in the received data frame is transmitted. When an ACK frame including information indicating that an error has been detected for one or more received HARQ blocks is transmitted, the one or more HARQ blocks are retransmitted from the transmission apparatus and can be received by the data frame reception unit 304. When the communication apparatus 103 receives the retransmitted HARQ block, the communication apparatus 103 can correct the error using the retransmitted HARQ block and the data frame in which the error has been detected.

The communication apparatus 103 may not have the data frame transmission unit 302 and the ACK frame reception unit 303. The communication apparatuses 104 and 105 may have the same functional configuration as the communication apparatus 103. The communication apparatus 102 may have the same functional configuration as the communication apparatus 103, but may not have the data frame reception unit 304 and the ACK frame transmission unit 305.

Figure 4:
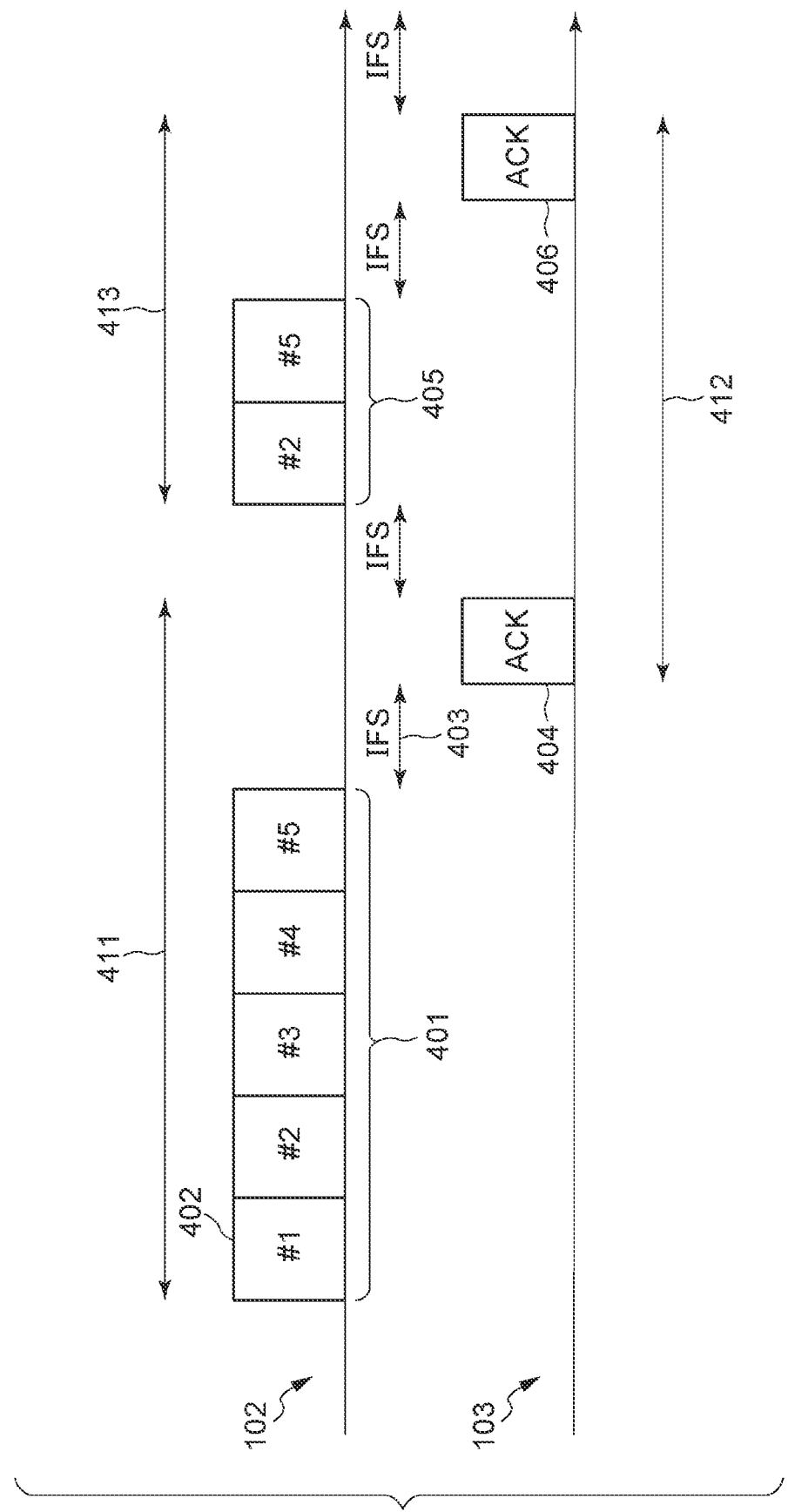
FIG. 4 is a diagram showing an example of transmission/reception of data frames executed by communication apparatuses 102 and 103.

FIG. 4 shows an example of transmission/reception of a data frame executed by the communication apparatuses 102 and 103 according to the present embodiment. In the present embodiment, an explanation is given, for example, for a case where the communication apparatus 102 transmits a data frame to the communication apparatus 103, and the communication apparatus 103 transmits an ACK frame to the communication apparatus 102. Note that a horizontal axis indicates a time axis.

First, the communication apparatus 102 transmits a data frame 401 to the communication apparatus 103. The data frame 401 includes five HARQ blocks including a leading HARQ block 402. When the communication apparatus 103 receives the data frame 401, the communication apparatus 103 waits for a lapse of IFS 403 and then transmits an ACK frame 404 to the communication apparatus 102 as a response to the data frame 401.

Note that IFS is an abbreviation for Inter Frame Space, which is a time interval between frames defined in the IEEE802.11 series standards. A data frame and an ACK frame are usually spaced in time by an amount called SIFS (Short Inter Frame Space). In addition to SIFS, IFS includes DIFS (DCF Inter Frame Space), PIFS (PCF Inter Frame Space), and EIFS (Extended Inter Frame Space). Among these IFSs, SIFS is the shortest one, and the length increases in the order of DIFS, PIFS, EIFS. In the present embodiment, it is assumed that the data frame 401 and the ACK frame 404 are spaced by an amount of SIFS, but they may be spaced by an amount of another IFS.

When the communication apparatus 102 transmits the data frame 401, the communication apparatus 102 transmits information for reserving the required communication time such that the information is incorporated in at least one of a PHY header and a MAC header. Note that PHY is an abbreviation for Physical Layer, and MAC is an abbreviation for Medium Access Control. In the present embodiment, it is assumed that the communication apparatus 102 reserves the communication reservation time 411 given by the sum of the communication time of the data frame 401, the IFS 403, and the communication time of the ACK frame 404, as the required communication time. When other communication apparatuses detects the communication reservation time 411 included in the data frame 401, these communication apparatuses suppress the transmission of data during the communication reservation time 411 to avoid interference.

In the present embodiment, it is assumed that the ACK frame 404 transmitted by the communication apparatus 103 includes information indicating that errors have been detected for second and fifth HARQ blocks as counted from the leading HARQ block. In addition to or instead of the information indicating the occurrence of errors, the ACK frame 404 may include information indicating that the first HARQ block, the third HARQ block, and the fourth HARQ block have been normally received.

When the communication apparatus 103 detects an error in a HARQ block included in the received data frame 401, the communication apparatus 103 calculates the time required for the communication apparatus 102 to retransmit the HARQ block. More specifically, the communication apparatus 103 calculates the communication time required for the communication apparatus 102 to retransmit the second HARQ block and the fifth HARQ block. The communication apparatus 103 transmits information indicating the communication reservation time 412 including at least the calculated communication time by incorporating the information in the ACK frame 404 thereby securing the communication time required for the retransmission of the HARQ blocks. In this case, the information indicating the communication reservation time 412 is included in at least one of the PHY header and the MAC header of the ACK frame 404. The communication reservation time 412 may include the communication time of the ACK frame 404 and the time required for the communication of the ACK frame 406 in response to the retransmitted HARQ block, in addition to the communication time of the data frame 405 including the retransmitted HARQ blocks. The communication reservation time 412 may include IFS required between frames. The IFS between each adjacent frames may be any of SIFS, DIFS, PIFS, and EIFS, but in the present embodiment, it is assumed that the SIFS with the shortest time is employed. As described above, the communication apparatus 103 calculates the communication time required for the retransmission of the HARQ blocks, and transmits it by incorporating it as the communication reservation time in the ACK frame, which makes it possible for the communication apparatus 102 to retransmit the HARQ blocks without performing the carrier sense processing. The transmission of data from a communication apparatus other than the communication apparatus 102 to the communication apparatus 103 is suppressed until the communication apparatus 103 receives the retransmitted HARQ blocks, which results in a reduction in the possibility that the communication apparatus 103 discards the error data frame. As a result, the communication apparatus 103 can efficiently perform the error correction of data.

Furthermore, the communication apparatus 103 can appropriately set the communication reservation time by calculating the communication time required for retransmitting, among the received HARQ blocks, only the HARQ blocks detected to have the error. In contrast, for example, in a case where in the transmission of the data frame 401, when the communication apparatus 102 sets the communication reservation time taking into account retransmission, the communication apparatus 102 does not know the number of HARQ blocks which need to be retransmitted. As a result, the communication reservation time may be set unnecessarily long, and thus there is a possibility that a time occurs during which no communication is performed. Conversely, the communication reservation time may be set too short. In this case, there is a possibility that the error correction is not completed within the reserved time, and thus the data frame may be transmitted again. In the case where the communication apparatus 103 sets the communication reservation time, the setting of the communication reservation time is performed after the communication apparatus 103 determines how many HARQ blocks the communication apparatus 103 is to issue a request for retransmission, and thus the communication apparatus 103 can properly sets the communication time. Furthermore, because the communication apparatus 103 transmits the ACK frame 404 including the communication reservation time determined taking into account the retransmission, it is possible to suppress the transmission of data by other apparatuses until the HARQ blocks are retransmitted by the communication apparatus 102. As a result, the communication apparatus 103 can improve the frequency utilization efficiency and suppress the reduction in the communication speed with the communication apparatus 102.

When the communication apparatus 102 receives the ACK frame 404, the communication apparatus 102 performs retransmission such that among the HARQ blocks of the data frame transmitted from the communication apparatus 102 to the communication apparatus 103, the communication apparatus 102 retransmits only the second HARQ block and the fifth HARQ block as counted from the leading HARQ block which have been detected to have errors. That is, the communication apparatus 102 transmits a data frame 405 including the second HARQ block and the fifth HARQ block as counted from the leading HARQ block to the communication apparatus 103. In this case, the communication apparatus 102 may calculate the communication reservation time 413 from the communication time of the data frame 405, IFS, and the communication time of the ACK frame 406 which will be transmitted from the communication apparatus 103. The communication apparatus 102 may incorporate information indicating the communication reservation time 413 in at least one of the MAC header and the PHY header of the data frame 405.

Upon receiving the data frame 405, the communication apparatus 103 transmits an ACK frame 406 including information indicating the reception state of HARQ blocks included in the data frame 405. When the communication apparatus 103 successfully receives the HARQ blocks included in the data frame 405, the communication apparatus 103 can execute the error correction using the received HARQ blocks and the corresponding previously received HARQ blocks.

Figure 5:
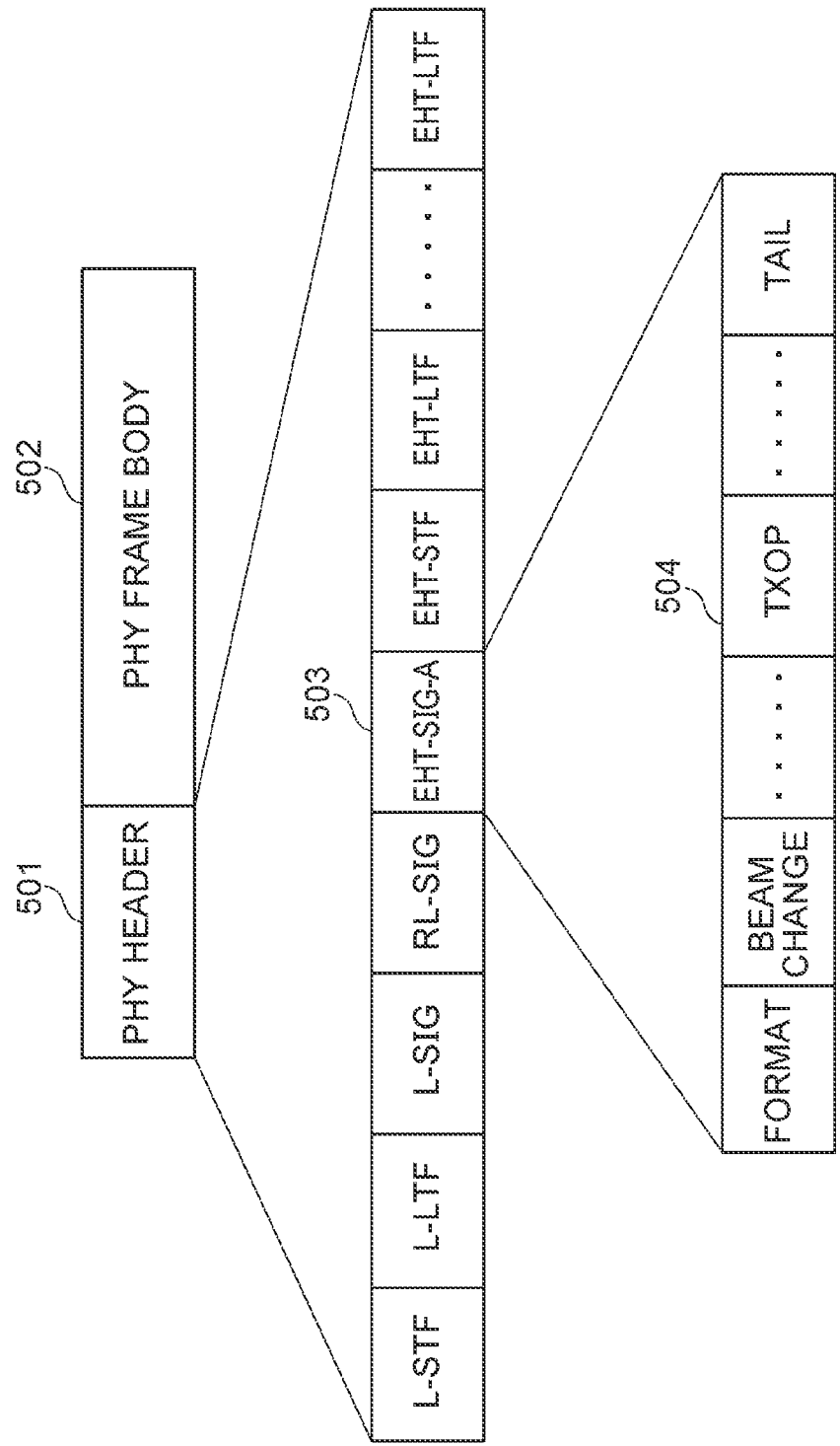
FIG. 5 is a diagram showing an example of a structure of a PHY frame.

FIG. 5. shows an example of a structure of a PHY frame according to the present embodiment. The PHY frame shown in FIG. 5 is a PHY frame used when communication is performed according to the IEEE802.11be standard.

The PHY frame includes a PHY header 501 and a PHY frame body 502. The PHY frame body 502 includes a MAC frame which will be described later with reference to FIG. 6.

The PHY header 501 includes L-STF, L-LTF, L-SIG, RL-SIG, EHT-SIG-A503, EHT-STF, and EHT-LTF arranged in this order from the beginning of the head. Note that EHT-SIG-B may be provided between EHT-SIG-A503 and EHT-STF. Note that the order of the fields in the PHY frame is not limited to the example described above. STF is an abbreviation for Short Training Field, LTF is an abbreviation for Long Training Field, and SIG is an abbreviation for Signal. L— is an abbreviation for Legacy. More specifically, for example, L-STF is an abbreviation for Legacy Short Training Field. Similarly, EHT— is an abbreviation for Extreme High Throughput. More specifically, for example, EHT-STF is an abbreviation for Extreme High Throughput Short Training Field. RL-SIG is an abbreviation for Repeated Legacy Signal.

L-STF, L-LTF, and L-SIG are each backwards compatible with the IEEE802.11a/b/g/n/ac/ax standards, which are legacy standards established prior to the IEEE802.11be standard. That is, L-STF, L-LTF, and L-SIG are legacy fields that can be decoded by a communication apparatus according to the IEEE802.11ax standard or the IEEE802.11 series standards prior to the IEEE802.11ax standard.

L-STF is used for radio packet signal detection, automatic gain control (AGC, Automatic Gain Control), timing detection, and/or the like. L-LTF is used for high-precision frequency/time synchronization, acquisition of propagation channel information (CSI, Channel State Information), and/or the like. L-SIG is used for transmitting control information including communication rate and length information. Note that RL-SIG may be omitted.

EHT-SIG-A503, EHT-SIG-B, EHT-STF, and EHT-LTF are EHT fields that can be decoded by a communication apparatus that supports the IEEE802.11be standard.

EHT-SIG-A503 includes a TXOP (Transmission Opportunity) field 504. When the communication apparatus transmits the PHY frame shown in FIG. 5, the communication apparatus may incorporate the calculated communication reservation time in the TXOP field 504. The PHY frame transmission apparatus can specify a TXOP length granularity (8 microseconds or 128 microseconds) and a TXOP length in the TXOP field 504. The TXOP length is calculated from the communication reservation time and the specified TXOP length granularity. For example, when the TXOP length granularity is 8 microseconds, the TXOP length equals the communication reservation time divided by 8 microseconds.

In the present embodiment, the communication reservation time is included in an EHT-SIG which is a SIG according to the IEEE802.11be standard, but this is by way of example and not by way of limitation. For example, the communication reservation time may be included in a SIG according to the legacy standard. More specifically, the communication reservation time may be included in an HT-SIG, which is a SIG according to the IEEE802.11n standard, or a VHT-SIG, which is a SIG according to the IEEE802.11ac standard. Alternatively, the communication reservation time may be included in an HE-SIG, which is a SIG according to the IEEE802.11ax standard. These SIGs may be included in the PHY header in addition to or instead of the EHT-SIG. HT is an abbreviation for High-Throughput, VHT is an abbreviation for Very High Throughput, and HE is an abbreviation for High Efficiency.

Figure 6:
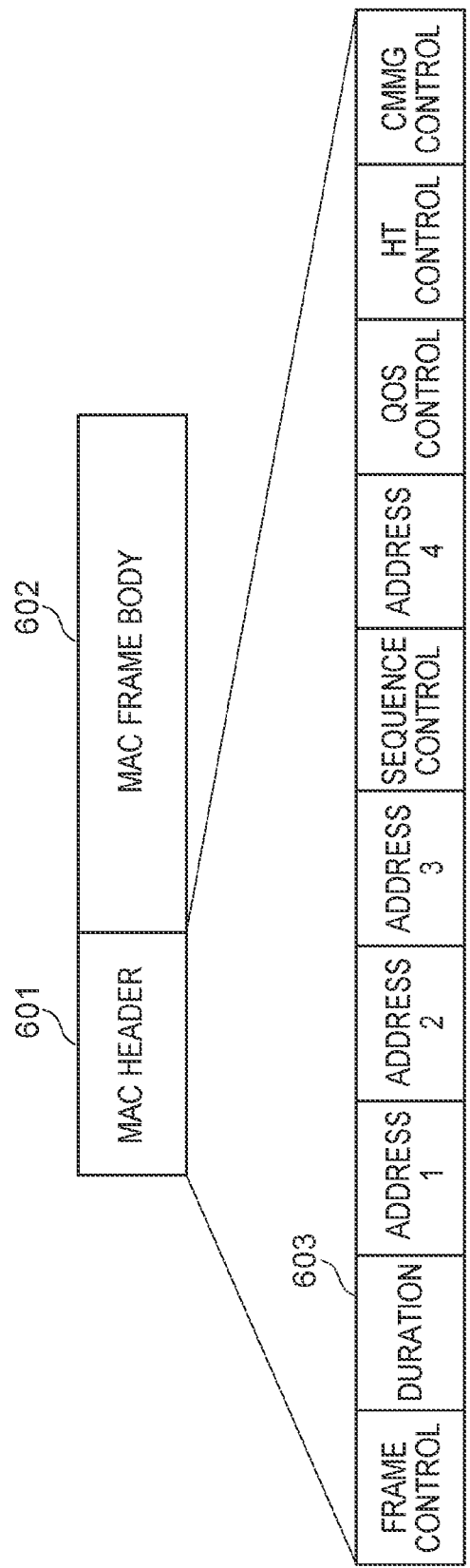
FIG. 6 is a diagram showing an example of a structure of a MAC frame.

FIG. 6. shows an example of a structure of a MAC frame according to the present embodiment. The MAC frame shown in FIG. 6 is a MAC frame used when communication is performed according to the IEEE802.11be standard.

The MAC frame includes a MAC header 601 and a MAC frame body 602. The MAC frame body 602 includes data to be transmitted.

The MAC header 601 includes a Frame Control, a Duration 603, Address 1, Address 2, Address 3, and Sequence Control in this order from the beginning of the MAC header 601. In addition to these fields, the MAC header 601 further includes Address 4, QoS Control, HT Control, and CMMG Control. Of these fields, Frame Control, Duration 603, and Address 1 are included in any type of MAC frame. Of these fields, fields other than Frame Control, Duration 603, and Address 1 may or may not be included depending on the type of MAC frame.

The Frame Control field includes information indicating the type of MAC frame. More specifically, it includes information indicating whether the MAC frame is a management frame, a control frame, or a data frame. It also includes information indicating a subtype of the MAC frame. For example, when the MAC frame is an ACK frame, information indicating that the type of the MAC frame is a control frame and information indicating that the subtype is an ACK frame are included.

The Duration field 603 includes the communication reservation time. The communication reservation time included in the Duration field 603 is specified in units of microseconds.

The Address 1 field includes address information indicating a communication apparatus to which the MAC frame is to be transmitted.

The Address 2 to 4 fields each include required address information depending on the type or subtype of the MAC frame. For example, when the type of the MAC frame is a data frame, the Address 2 field includes address information indicating a transmission apparatus that transmits the data frame. The Address 3 field and the Address 4 field each includes appropriate address information depending on the address information included in the Address 1 field and the Address 2 field. Note that the Address 4 field may be omitted depending on the address information included in the Address 1 field and the Address 2 field. For example, in a case where the Address 1 field includes a MAC address of a destination communication apparatus and the Address 2 field includes a MAC address of a source communication apparatus, the Address 3 field includes a BSSID. In this case, the Address 4 field does not include anything and is omitted. Note that these fields may be omitted depending on the type or subtype of the MAC frame. For example, in a case where the MAC frame is an ACK frame, the Address 2 to the Address 4 fields may be omitted.

A Sequence Control field is a field including a sequence number and a fragment number. When the MAC frame is an ACK frame, the Sequence Control field may be omitted.

A QoS Control field is a field that includes information indicating a traffic category or a traffic stream of a MAC frame. Note that the QoS Control field may include an ACK Policy that specifies presence/absence or a format of ACK supplied from an apparatus with which the communication apparatus communicates. When the MAC frame is an ACK frame, the QoS Control field may be omitted.

An HT (High Throughput) Control field includes information according to a communication standard used for the MAC frame. In the present embodiment, since the communication of the MAC frame is performed according to the IEEE802.11be standard, the HT Control field includes information necessary for the communication according to the IEEE802.11be standard. When the MAC frame is an ACK frame, the HT Control field may be omitted.

A CMMG Control field includes information related to a China millimeter-wave multiple gigabit (CMMG). In a case where a communication apparatus that transmits the MAC frame does not execute CMMG communication or does not support CMMG, this field is omitted. When the MAC frame is an ACK frame, the CMMG Control field may be omitted.

When another communication apparatus detects the PHY frame shown in FIG. 5 or the MAC frame shown in FIG. 6, the other communication apparatus sets a NAV based on the communication reservation time included in the TXOP field 504 of the PHY header or the Duration field 603 of the MAC header. NAV is an abbreviation for Network Allocation Vector, and is an indicator which is held in each communication apparatus and which indicates a period of time in which a communication apparatus does not start communication. Note that the communication apparatus does not start communication in the period indicated by the NAV regardless of whether or not a busy status is detected by carrier sense. In a case where the address information included in the PHY frame or MAC frame detected by the communication apparatus points to the present communication apparatus, the communication apparatus does not set or update the NAV. Also in a case where the address information on the transmission source apparatus included in the PHY frame or MAC frame detected by the communication apparatus corresponds to the address information on the communication apparatus, the communication apparatus does not set or update the NAV. In a case where when the communication apparatus detects the PHY frame or the MAC frame, if the NAV has not been set, the communication apparatus sets the NAV based on a value included in the TXOP field 504 or the Duration field 603. In a case where the NAV is already set in the communication apparatus, if the period indicated by the TXOP field 504 is longer than the remaining period indicated by the NAV, the NAV is updated based on the value indicated by the TXOP field 504. Alternatively, in the case where the NAV is already set in the communication apparatus, when the period indicated by the Duration field 603 is longer than the remaining period indicated by the NAV, the communication apparatus may update the NAV based on the value indicated by the Duration field 603. On the other hand, when the period indicated by the TXOP field 504 or the Duration field 603 is shorter than the remaining period indicated by the NAV, the NAV is not updated. As described above, the communication apparatus can avoid communication collisions without performing carrier sense by setting or updating the NAV based on the TXOP field 504 or the Duration field 603.

In the present embodiment, the TXOP field 504 or the Duration field 603 includes the communication reservation time calculated taking into account the communication time required for retransmitting a HARQ block, and thus it is possible for another communication apparatus to hold NAV including the communication time required for retransmitting the HARQ block. Thus, when the HARQ block is retransmitted, it is possible to prevent interference by communication executed by any other communication apparatuses. Furthermore, in the present embodiment, the communication apparatus determines the communication reservation time taking into account the HARQ block that needs to be retransmitted, and thus the communication reservation time is appropriately set.

Figure 7:
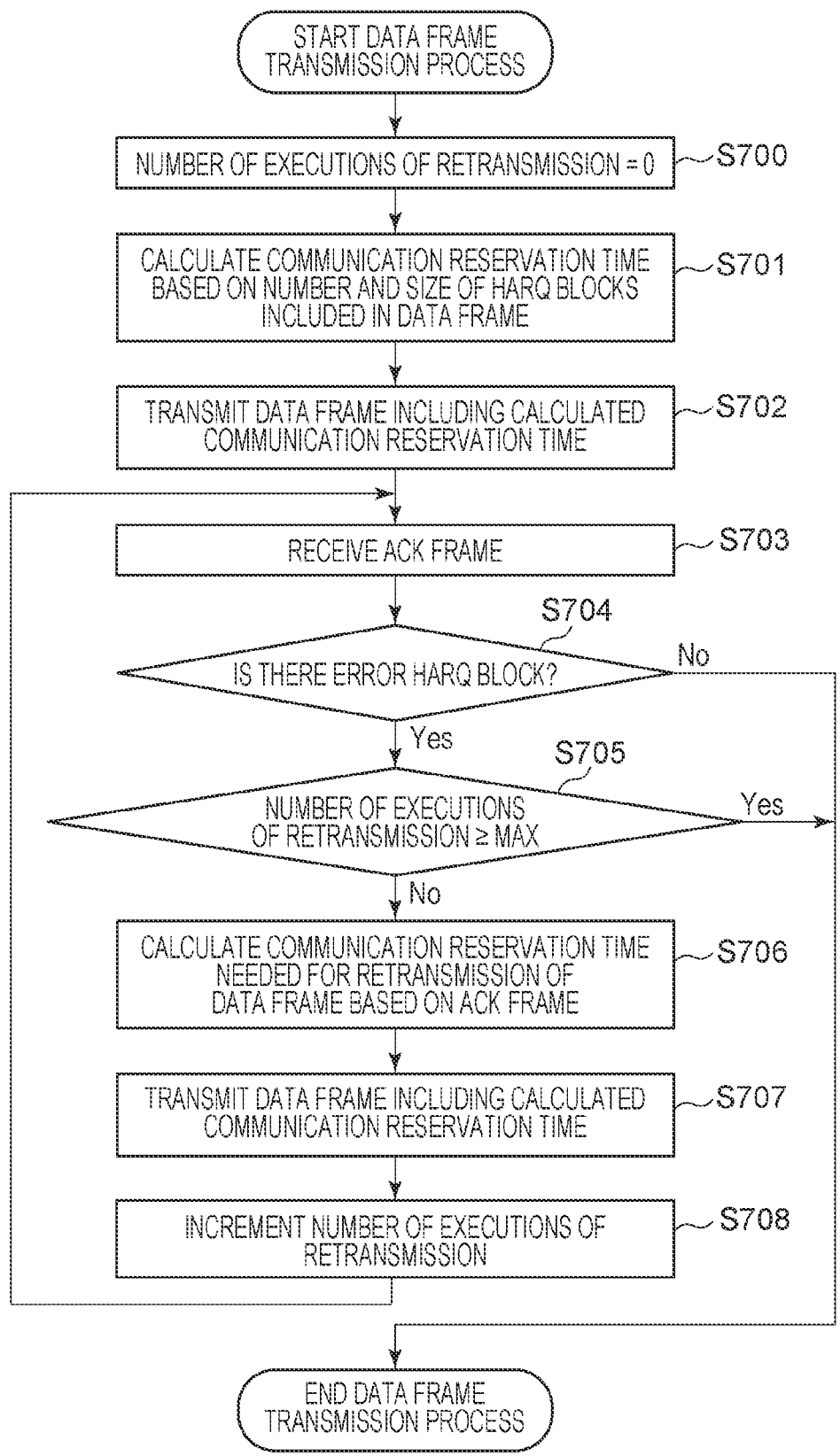
FIG. 7 is a flowchart showing a process executed by the communication apparatus 102 to transmit a data frame using HARQ.

FIG. 7 is a flowchart showing a process executed by the control unit 202 by reading and executing a computer program stored in the storage unit 201 when the communication apparatus 102 transmits a data frame using HARQ.

This flowchart is started when the communication apparatus 102 transmits a data frame to the communication apparatus 103. Alternatively, the flowchart may be started when a user instructs the communication apparatus 102 to transmit data to the communication apparatus 103. Alternatively, the flowchart may be started when an application on the communication apparatus 102 instructs the communication apparatus 102 to transmit data to the communication apparatus 103.

The communication apparatus 102 sets the counter of the number of executions of retransmission of the data frame to 0 (S700). Note that this counter is held separately for each data frame.

The communication apparatus 102 calculates a required communication reservation time based on the size and number of HARQ blocks included in the data frame to be transmitted to the communication apparatus 103 (S701). The communication apparatus 102 determines, in advance, the data size of one HARQ block via negotiation with the communication apparatus 103 and holds the predetermined size of the HARQ block. The communication apparatus 102 divides the data to be transmitted in units of the predetermined data sizes into a plurality of HARQ blocks. After the communication apparatus 102 divides the data into the plurality of HARQ blocks, the communication apparatus 102 calculates the amount of data to be transmitted from the number of HARQ blocks and the data size per HARQ block, and based on these calculated values, further calculates the communication time. Note that the communication apparatus 102 may hold in advance the required communication time per HARQ block. The communication apparatus 102 may hold in advance a table showing the correspondence between the number of HARQ blocks and the required communication time. In this case, the communication apparatus 102 may refer to the held table and acquire the required communication time from the table based on the number of HARQ blocks. Although it has been described above that in the present embodiment, the data size per HARQ block is determined via the negotiation between the communication apparatuses 102 and 103, one of the apparatuses may notify the other of the data size. Alternatively, the data size per HARQ block may be set in advance in the communication apparatuses 102 and 103.

Note that the communication reservation time is calculated based on, in addition to the size and number of HARQ blocks to be transmitted, the coding rate and modulation method used when the HARQ blocks are transmitted. Alternatively, the communication apparatus 102 may calculate the communication time based on the size of the data frame to be transmitted, the coding rate, and the modulation method.

In this case, in addition to the communication time required for the communication of the data frame to be transmitted, the communication apparatus 102 incorporates into the communication reservation time the communication time required for receiving the ACK frame to be transmitted by the communication apparatus 103. More specifically, the communication apparatus 102 calculates the communication reservation time 411 shown in FIG. 4. The communication apparatus 102 calculates the communication time required to receive the ACK frame from the communication apparatus 103 based on the size of the ACK frame to be transmitted and the coding rate and the modulation method used when the ACK frame is transmitted. In this calculation, the communication apparatus 102 calculates the communication time of the ACK frame using the coding rate and the modulation method used when the communication apparatus 102 transmits HARQ blocks to the communication apparatus 103. Alternatively, the communication apparatus 102 may calculate the communication time of the ACK frame using the coding rate and the modulation method used when the communication apparatus 102 transmits an ACK frame. Alternatively, in a case where the communication apparatus 102 stores the coding rate and the modulation method used in the past for the ACK frame received from the communication apparatus 103, the communication apparatus 102 may calculate the communication time of the ACK frame based on the stored coding rate and the modulation method. Alternatively, the communication apparatus 102 may hold a fixed value for the communication time of the ACK frame.

The communication apparatus 102 transmits a data frame including the communication reservation time calculated in S701 (S702). The communication apparatus 102 incorporates the calculated communication reservation time in at least one of the TXOP field 504 shown in FIG. 5 or the Duration field 603 shown in FIG. 6. In the present embodiment, the communication reservation time 411 shown in FIG. 4 is included, as the communication reservation time calculated in S701, in the data frame. Therefore, the communication apparatus 102 can prevent communication from being interfered during a period from the transmission of the data frame to the reception of the ACK frame from the communication apparatus 103.

Next, the communication apparatus 102 receives an ACK frame in response to the transmitted data frame from the communication apparatus 103 (S703).

The communication apparatus 102 determines, based on the received ACK frame, whether or not there is an error HARQ block (S704). More specifically, the communication apparatus 102 determines whether the received ACK frame includes information indicating a HARQ block that the communication apparatus 103 could not correctly receive. In a case where the received ACK frame does not include information indicating a HARQ block that the communication apparatus 103 could not correctly receive, the communication apparatus 102 determines No in this step, and ends the processing of the present flow. On the other hand, in a case where the received ACK frame includes information indicating a HARQ block that the communication apparatus 103 could not correctly receive, the communication apparatus 102 determines Yes in this step, and performs processing in S705.

The communication apparatus 102 determines whether or not the value of the counter of the number of executions of retransmission has reached an upper limit (S705). More specifically, the communication apparatus 102 compares the current value of the counter of the number of the executions of retransmission with the upper limit preset in the communication apparatus 102, and if the current value of the counter is smaller than the upper limit, the communication apparatus 102 determines No in this step and performs the processing in S706. On the other hand, in a case where the current value of the counter is equal to or greater than the upper limit of the number of executions of retransmission, it is determined Yes in this step, and the processing of the present flow is ended. Note that when it is determined Yes in the present step, the communication apparatus 102 may notify a user of an error before the processing of the present flow is ended. The upper limit of the number of executions of retransmission may be preset in the communication apparatus 102 or may be set by a user.

Next, the communication apparatus 102 calculates the communication reservation time required for the retransmission of the data frame based on the received ACK frame (S706). More specifically, the communication apparatus 102 subtracts the time required for the communication apparatus 103 to transmit the ACK frame and the IFS from the communication reservation time (the communication reservation time 412 shown in FIG. 4) included in the ACK frame received in S703, and sets the result as the communication reservation time. Alternatively, the communication apparatus 102 may calculate the time needed to retransmit the HARQ blocks determined based on the information included n the ACK frame and the time needed to receive the ACK frame to be transmitted by the communication apparatus 103 in response to the retransmitted HARQ blocks. The communication reservation time calculated in this step is a time corresponding to the communication reservation time 413 shown in FIG. 4. In this calculation, the communication apparatus 102 calculates the communication time of the ACK frame using the coding rate and the modulation method used when the communication apparatus 102 transmits HARQ blocks to the communication apparatus 103. Alternatively, the communication apparatus 102 may calculate the communication time of the ACK frame using the coding rate and the modulation method used when the communication apparatus 102 transmits an ACK frame. Alternatively, in a case where the communication apparatus 102 stores the coding rate and the modulation method used in the past for the ACK frame received from the communication apparatus 103, the communication apparatus 102 may calculate the communication time of the ACK frame based on the stored coding rate and the modulation method. Alternatively, the communication apparatus 102 may calculate the communication time of the ACK frame using the coding rate and the modulation method used for the ACK frame received in S703.

In the present embodiment, the communication apparatus 102 calculates, in S706, the communication time corresponding to the communication reservation time 413 in FIG. 4, but this is merely an example and not by way of limitation. The communication apparatus 102 may calculate, as the communication time, only the time required for the communication of the retransmitted HARQ block determined based on the information included in the ACK frame.

The communication apparatus 102 transmits a data frame including the communication reservation time calculated in S706 (S707). The data frame transmitted in this step includes a HARQ block to be retransmitted. The communication apparatus 102 incorporates the calculated communication reservation time in at least one of the TXOP field 504 shown in FIG. 5 or the Duration field 603 shown in FIG. 6. In the present embodiment, the communication reservation time 413 shown in FIG. 4 is included, as the communication reservation time calculated in S706, in the data frame. Therefore, the communication apparatus 102 can prevent communication from being interfered during a period from the transmission of the data frame to the reception of the ACK frame from the communication apparatus 103. Note that the communication apparatus 102 performs the retransmission of the HARQ frame in the present step by using the coding rate and the modulation method used when the data frame is transmitted in S702.

After the retransmission of the HARQ block in S707 is performed, the communication apparatus 102 increments the counter of the number of executions of retransmission (S708), and returns to the processing in S703.

As shown in FIG. 7, when the communication apparatus 102 calculates the communication reservation time, the communication apparatus 102 can appropriately set the communication reservation time by performing the calculation based on the number and size of HARQ blocks needed to be retransmitted. When the communication reservation time is calculated, the communication apparatus 102 calculates, in addition to the communication time needed for transmitting the data frame, also the communication time required for receiving the ACK frame to be transmitted in response to this data frame. Therefore, the communication apparatus 102 can prevent communication from being interfered during a period from the transmission of the data frame to the reception of the ACK frame.

In the present embodiment, it is assumed that the communication apparatus 102 has the counter of the number of executions of retransmission and does not perform the retransmission a greater number of times than the set upper limit, but this is merely by way of example and not by way of limitation. In a case where the upper limit of the number of executions of retransmission is not set in the communication apparatus 102, S700, S705 and S708 may be omitted.

Figure 8:
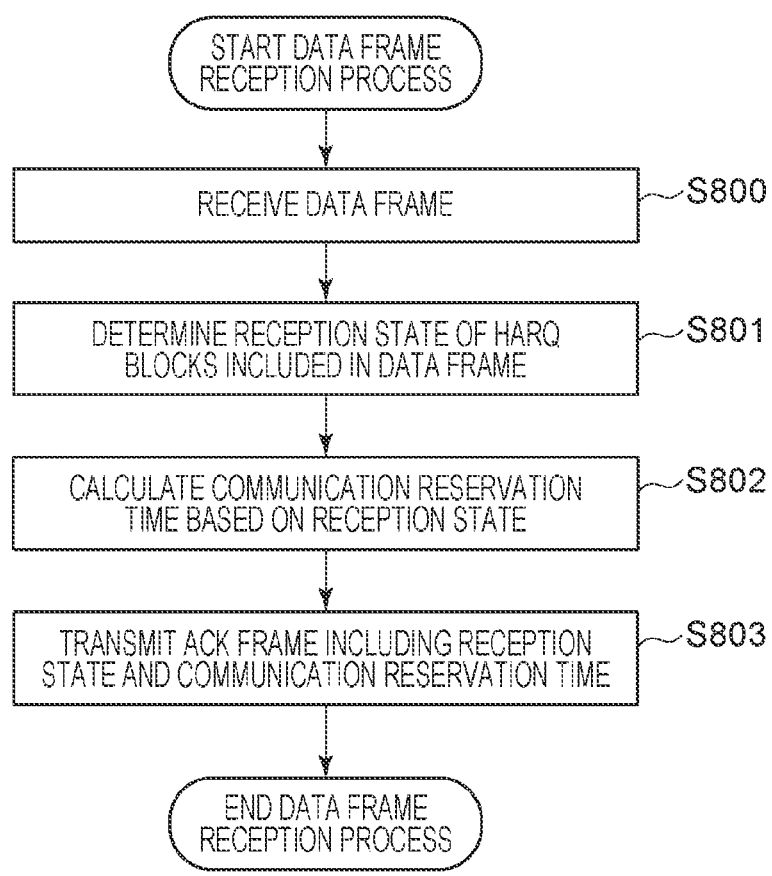
FIG. 8 is a flowchart showing a process executed by the communication apparatus 103 to transmit a data frame using HARQ.

FIG. 8 is a flowchart showing a process executed by the control unit 202 by reading and executing a computer program stored in the storage unit 201 when the communication apparatus 103 receives a data frame using HARQ. This flowchart starts when the power of the communication apparatus 103 is turned on. Alternatively, the flowchart may start when a user instructs the communication apparatus 103 to receive data. Alternatively, the flowchart may start when an application on the communication apparatus 103 instructs the communication apparatus 103 to receive data.

The communication apparatus 103 receives a data frame from the communication apparatus 102 (S800). The data frame received here include one or more HARQ blocks.

Next, the communication apparatus 103 determines the reception state of the HARQ blocks included in the received data frame (S801). The communication apparatus 103 determines whether or not each of the received HARQ blocks has been normally received.

The communication apparatus 103 calculates the communication reservation time to be included in the ACK frame based on the reception state of the HARQ blocks determined in S801 (S802). More specifically, in a case where the received HARQ blocks include a HARQ block that has not been correctly received, the communication apparatus 103 calculates the communication reservation time including the communication time required for retransmitting the HARQ block which has not been correctly received. In this case, the communication reservation time includes the communication time required for the communication apparatus 103 to transmit the ACK frame and the time required for the communication apparatus 102 to retransmit the HARQ block. In the present step, the communication reservation time 412 shown in FIG. 4 is calculated. The communication time required for the communication apparatus 102 to retransmit the HARQ blocks is calculated from the number HARQ blocks to be retransmitted and the size of the data. The communication apparatus 103 determines, in advance, the data size per HARQ block via negotiation with the communication apparatus 102 and holds the predetermined size of the HARQ block. The communication apparatus 103 calculates the size of the data frame including HARQ blocks to be retransmitted from the communication apparatus 102 based on the number of HARQ blocks that failed to be received and the held size per HARQ block. The communication apparatus 103 can calculate the communication time required to retransmit the HARQ blocks from the calculated size of the data frame for the retransmission. Note that the communication apparatus 103 may hold in advance the required communication time per HARQ block. The communication apparatus 103 may hold in advance a table showing the correspondence between the number of HARQ blocks and the required communication time. In this case, the communication apparatus 103 may refer to the held table and acquire the required communication time from the table based on the number of HARQ blocks. Although it has been described above that in the present embodiment, the data size per HARQ block is determined via the negotiation between the communication apparatuses 102 and 103, one of the apparatuses may notify the other one of the data size.

Alternatively, the data size per HARQ block may be set in advance in the communication apparatuses 102 and 103. The calculation of the communication time required for retransmitting the HARQ blocks is performed based on the coding rate and the modulation method used by the communication apparatus 102 in retransmitting the HARQ blocks, wherein the code rate and the modulation method used here are the same as those used in the data frame received in S800. The communication reservation time includes the communication time required for the communication apparatus 103 to transmit the ACK frame in response to the HARQ blocks retransmitted. However, the communication reservation time calculated in the present step may not include the communication time of the ACK frame transmitted by the communication apparatus 103 in response to the retransmitted HARQ blocks. In a case where it is determined in S801 that all HARQ blocks have been normally received, the communication apparatus 103 calculates the communication reservation time including only the time required to transmit the ACK frame in this step. Note that the communication apparatus 103 may hold a fixed value for the communication time of the ACK frame.

The communication apparatus 103 transmits the ACK frame including the reception state determined in S801 and the communication reservation time calculated in S802 (S803). The communication apparatus 103 incorporates the calculated communication reservation time in at least one of the TXOP field 504 shown in FIG. 5 or the Duration field 603 shown in FIG. 6. In the present embodiment, the communication reservation time 412 shown in FIG. 4 is included, as the communication reservation time calculated in S802, in the ACK frame. Therefore, the communication apparatus 103 can prevent communication from being interfered during a period from the transmission of the ACK frame to the reception of the HARQ blocks retransmitted from the communication apparatus 102. After the communication apparatus performs the process in S803, the communication apparatus ends the process of the present flow.

When the communication apparatus 103 receives the data frame including the HARQ block retransmitted by the communication apparatus 102 in S707 in FIG. 7, the communication apparatus 103 again starts the process of the present flow again from S800. In this case, when the communication apparatus 103 receives the retransmitted HARQ block, the communication apparatus 103 performs an error correction process using the data frame that could not be correctly received before and the retransmitted HARQ block. In a case where the error correction is executed successfully for the HARQ block that could not be received correctly before, the communication apparatus 103 determines that the reception state of the corresponding HARQ block is now in the correctly received state. In a case where the error correction cannot be executed successfully even when the retransmitted HARQ block is used, the communication apparatus 103 determines that the reception state of the corresponding HARQ block is in the reception error state.

As shown in FIG. 8, since the communication apparatus 103 that receives the data frame sets the communication reservation time based on a HARQ block that needs to be retransmitted, the communication reservation time can be appropriately set and thus it is possible to improve the frequency utilization efficiency.

In the present embodiment, it is assumed that when the communication apparatus 103 receives a data frame, the communication apparatus 103 transmits an ACK frame as a response signal (the ACK frame 404, the ACK frame 406 in FIG. 4). However, this is merely by way of example and not by way of limitation. In a case where the communication apparatus 103 fails to correctly receive some HARQ block, the communication apparatus 103 may transmit a NACK frame as a response signal instead of the ACK frame. NACK is an abbreviation for Negative ACKnowledgement. Also in the case where the communication apparatus 103 transmits the NACK frame, the communication apparatus 103 transmits the information indicating the reception state of the received HARQ blocks and a calculated communication reservation time in the NACK frame as in the case where the ACK frame is transmitted. The NACK frame may include information indicating a HARQ block that could not be normally received as information indicating the reception state of the HARQ blocks. In a case where the communication apparatus 103 determines that all HARQ blocks have been normally received, the communication apparatus 103 may transmit the ACK frame.

In the present embodiment, it is assumed, as shown in FIG. 4, that retransmission occurs for part of HARQ blocks (the second and fifth HARQ blocks) among the plurality of transmitted HARQ blocks. However, this is by way of example and not by way of limitation. For example, retransmission may occur for all HARQ blocks of the plurality of transmitted HARQ blocks. In this case, at least one of the communication apparatuses 102 and 103 may calculate the communication reservation time based on all the HARQ blocks to be retransmitted.

In the present embodiment, the communication apparatuses 102 and 103 calculate the communication time of the data frame 405 as the communication time of the retransmitted HARQ block. In the present embodiment, the data frame 405 (the retransmitted data) includes the second HARQ and the fifth HARQ block to be retransmitted. However, this is merely by way of example and not by way of limitation. The data frame 405 may further include other data in addition to the retransmitted HARQ blocks. In this case, the communication apparatuses 102 and 103 calculate the communication time of the retransmitted data including the HARQ blocks and other data.

At least a part or all of the flowchart of the communication apparatus 102 shown in FIG. 7 may be realized by hardware. At least a part or all of the flowchart of the communication apparatus 103 shown in FIG. 8 may be realized by hardware. When hardware is used for realization, for example, a dedicated circuit may be generated on an FPGA based on a computer program for realizing the steps using, for example, a particular complier, and the resultant dedicated circuit may be used. FPGA is an abbreviation for Field Programmable Gate Array. Alternatively, a Gate Array circuit may be formed in a similar manner to the FPGA thereby achieving the realization using hardware. Alternatively, an ASIC (Application Specific Integrated Circuit) may be used for the realization.

The present invention may also be implemented by providing a program for realizing one or more functions of the embodiment to a system or an apparatus via a network or a storage medium, and reading out and executing the program by one or more processors in a computer disposed in the system or the apparatus. The present invention may also be implemented using a circuit (for example, an ASIC) for realizing one or more functions of the embodiment.

According to the present invention, it is possible to improve the frequency utilization efficiency by reserving an appropriate communication time when a part of the received data is retransmitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
reception means configured to receive data from another communication apparatus;
acquisition means configured to acquire a communication time of retransmission data which is a part of the data received by the reception means and which is to be retransmitted by the other communication apparatus and a communication time of a first response signal to be transmitted in response to the data received by the reception means; and
transmission means for transmitting the first response signal in which a communication reservation time is set, the communication reservation time including the communication time of the retransmission data and the communication time of the first response signal which are acquired by the acquisition means.

2. The communication apparatus according to claim 1, further comprising determination means configured to determine a reception state of the data received by the reception means,
wherein the acquisition means acquires a communication time of the retransmission data that is a part of the data received by the reception means and is determined by the determination means as not having been normally received.

3. The communication apparatus according to claim 2, wherein the first response signal transmitted by the transmission means includes information indicating the reception state of at least a part of the data determined by the determination means.

4. The communication apparatus according to claim 1, wherein the acquisition means further acquires a communication time of a second response signal transmitted by the communication apparatus in response to the retransmission data retransmitted by the other communication apparatus, and
the communication reservation time includes the communication time of the retransmission data, the communication time of the first response signal, and the communication time of the second response signal.

5. The communication apparatus according to claim 1, further comprising processing means configured to correct an error in the data received by the reception means by combining the retransmission data transmitted by the other communication apparatus and the data received by the reception means.

6. The communication apparatus according to claim 1, wherein the transmission means sets a value based on the communication reservation time in at least one of a TXOP (Transmission Opportunity) field of a PHY (Physical Layer) header and a Duration field of a MAC (Medium Access Control) header of the first response signal.

7. The communication apparatus according to claim 1, wherein the acquisition means acquires the communication time of the retransmission data by using a coding rate and a modulation method used for transmitting the retransmission data.

8. The communication apparatus according to claim 7, wherein the coding rate and the modulation method used for transmitting the retransmission data are the coding rate and the modulation method used for transmitting the data received by the reception means.

9. The communication apparatus according to claim 1, wherein the first response signal transmitted by the transmission means is an ACK (ACKnowledgement) frame.

10. The communication apparatus according to claim 1, wherein the first response signal transmitted by the transmission means is a NACK (Negative ACKnowledgement) frame.

11. The communication apparatus according to claim 1, wherein the reception means receives the data including a plurality of HARQ (Hybrid Automatic Repeat reQuest) blocks from the other communication apparatus via communication according to an IEEE802.11be standard, and
the transmission means transmits the first response signal via communication according to the IEEE802.11be standard.

12. A method for controlling a communication apparatus, comprising:
receiving data from another communication apparatus;
acquiring a communication time of retransmission data which is a part of the received data and which is to be retransmitted by the other communication apparatus and a communication time of a response signal to be transmitted in response to the received data; and
transmitting the response signal in which a communication reservation time is set, the communication reservation time including the communication time of the retransmission data and the acquired communication time of the response signal.

13. A non-transitory computer-readable storage medium storing a computer-executable program for causing a computer to execute a method for controlling a communication apparatus, the method comprising:
receiving data from another communication apparatus;
acquiring a communication time of retransmission data which is a part of the received data and which is to be retransmitted by the other communication apparatus and a communication time of a response signal to be transmitted in response to the received data; and
transmitting the response signal in which a communication reservation time is set, the communication reservation time including the communication time of the retransmission data and the acquired communication time of the response signal.

* * * * *